United States Patent

[11] 3,609,524

| [72] | Inventor | Edward J. Kazmer<br>Allentown, Pa. |
|---|---|---|
| [21] | Appl. No. | 822,669 |
| [22] | Filed | May 7, 1969 |
| [45] | Patented | Sept. 28, 1971 |
| [73] | Assignee | Western Electric Company, Incorporated<br>New York, N.Y. |

[54] APPARATUS FOR DETERMINING THE "OPERATE" VALUE OF SEALED CONTACTS
8 Claims, 4 Drawing Figs.

[52] U.S. Cl. .................................................. 324/28 RS,
335/207, 324/34 RS
[51] Int. Cl. .................................................. G01r 31/02
[50] Field of Search .......................................... 324/28, 34
RS; 335/151–154, 205–207; 73/167; 29/593, 622

[56] References Cited
UNITED STATES PATENTS

| 2,855,017 | 10/1958 | Pollard .......................... | 324/28 |
| 2,882,648 | 4/1959 | Hougaard ....................... | 29/622 |
| 3,253,214 | 5/1966 | Heilweil ........................ | 324/28 |
| 3,198,902 | 8/1965 | Deshautreaux ................. | 335/153 |

*Primary Examiner*—Michael J. Lynch
*Attorneys*—H. J. Winegar, R. P. Miller and R. Y. Peters

ABSTRACT: The "operate" value of a sealed contact is determined by: arranging rod-shaped permanent magnets so as to obtain an elongated magnetic field, the flux density of which increases from one end to the other; placing the sealed contact in the magnetic field; and moving the contact along the field in the direction of increasing flux density until it operates. The strength of the magnetic field at the point of operation reveals the "operate" value of the sealed contact.

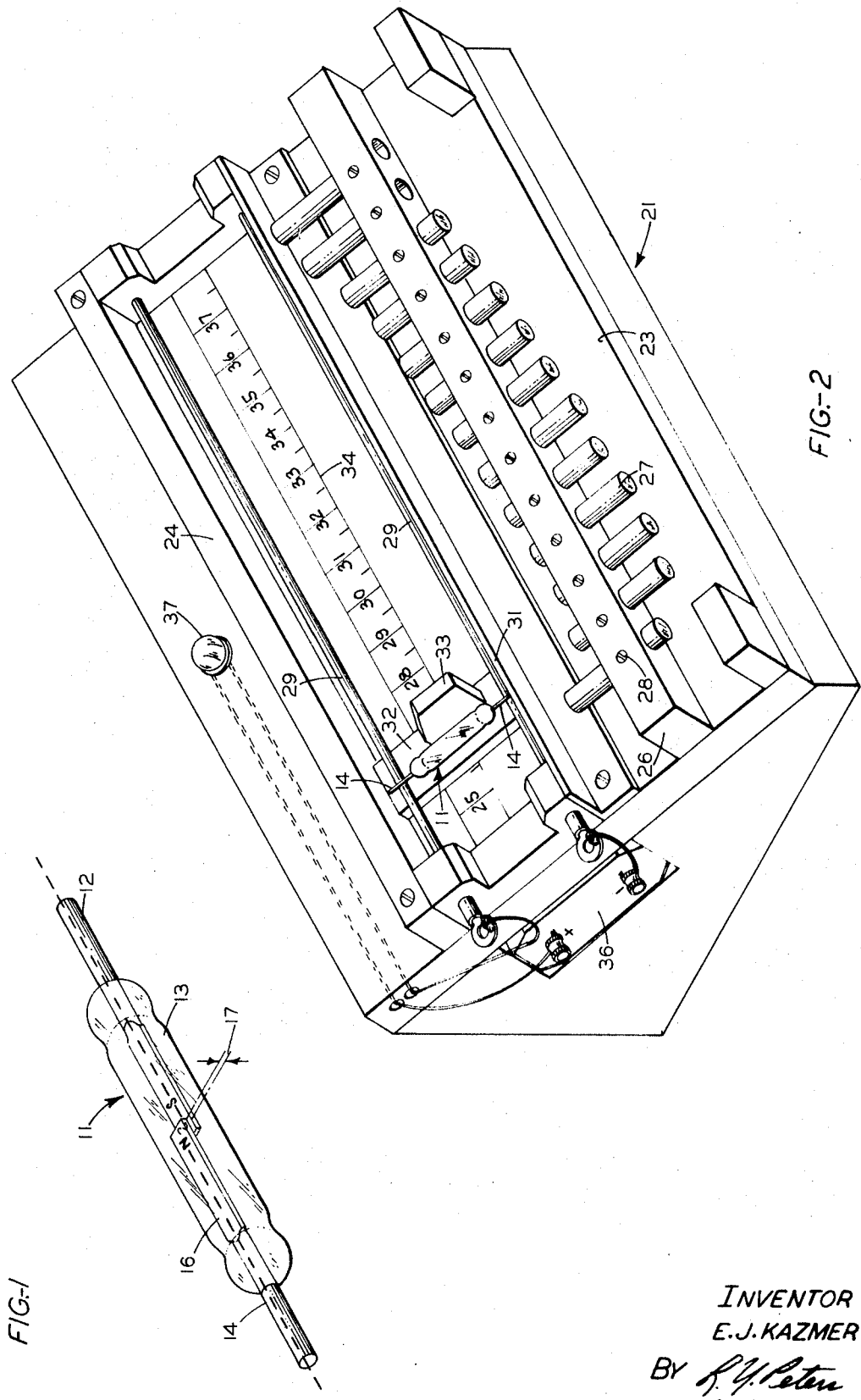

FIG.-3
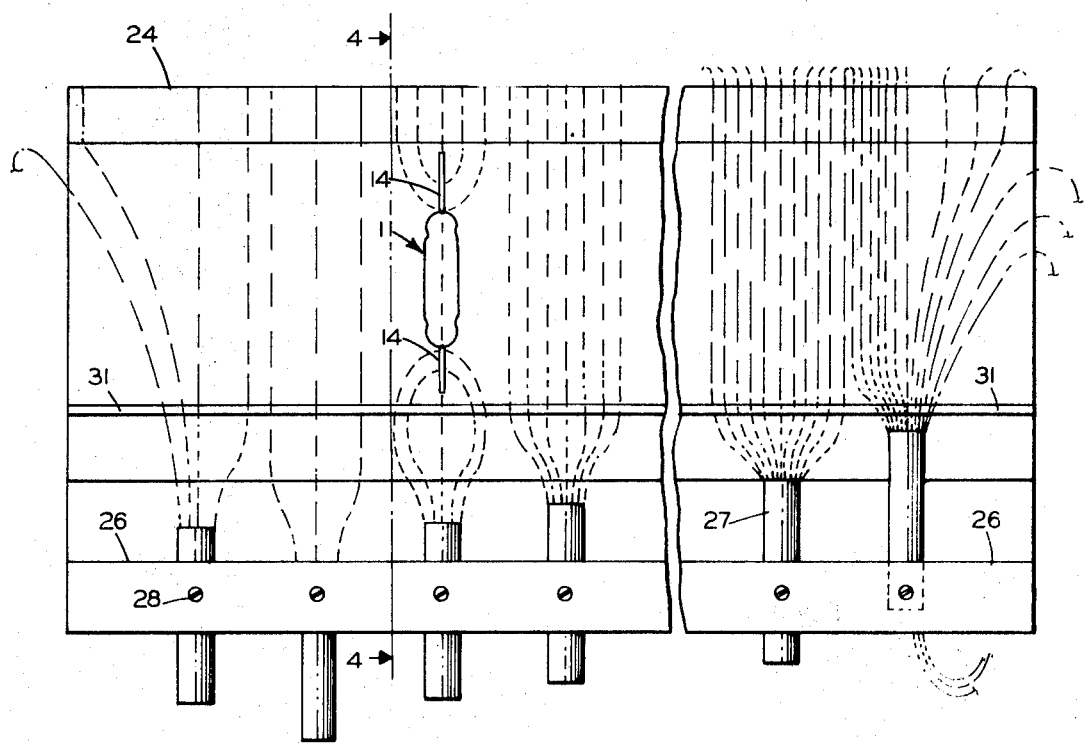
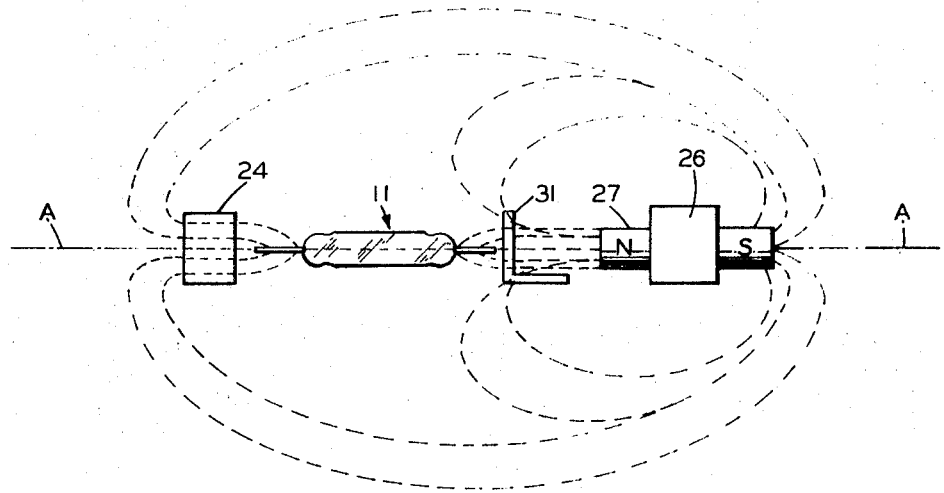
FIG.-4

APPARATUS FOR DETERMINING THE "OPERATE" VALUE OF SEALED CONTACTS

BACKGROUND OF THE INVENTION

This invention relates to determining the "operate" value of sealed contacts and, more particularly, to determining such value by means of a fixed magnetic field.

Sealed contacts of the dry-reed type, often called "dry-reed switches" in the art, consist of two ferromagnetic flexible reeds sealed into a piece of glass tubing. The reeds are axially and partially inserted into the tubing, one from each end, so that the internal ends overlap axially but are spaced transversely a small distance to establish a gap between them.

When such a sealed contact is inserted in a magnetic field, a flux path if formed along one reed, across the transverse air gap at the overlapping ends and thence along the other reed. The overlapping ends of the reeds are, thereby, oppositely polarized an attracted to each other, but only when the reeds are under the influence of the magnetic field. If the magnetic flux is strong enough, the attractive force overcomes the resistance of the reeds to bending, i.e., the reed stiffness, and the reeds contact each other. However, when the magnetic field is removed the reeds spring back to their original position due to their stiffness. Thus, when a sealed contact is inserted in an appropriate coil, the current flowing through the coil produces a magnetic flux which closes the reeds, i.e., "operates" the contact. When the coil is deenergized, the reeds open, i.e., the contact "releases."

The amount of flux measured in ampere turns required to close the contact is known as the "operate" value and, for a given reed geometry, is determined largely by the magnitude of the gap and the amount of the overlap. Accordingly, the size of the gap and the amount of the overlap are adjusted to yield the desired "operate" value.

More complete information, relating to the structure, theory of operation and use of sealed contacts, is set forth in the articles by A. C. Keller "Recent Developments in Bell system Relays-Particularly Sealed Contacts and Miniature Relays," Bell System Technical Journal, Jan. 1964, pages 15–18; R. L. Peak, "Magnetization and Pull Characteristics of Mating Reeds," Bell System Technical Journal, March 1961, pages 523–525; and Roger L. Rosenberg, "Reed Switching Devices," Electric Controls Reference Issue, Machine Design, Vol. 41, March 13, 1969, pages 38–40.

In the prior art, the coil method of testing a sealed contact has been used for determining the need for adjustment of the gap and overlap setting mechanisms of machines which assemble the sealed contacts. This method includes the steps of: placing the sealed contact inside an electromagnetic coil having a known number of turns of wire; applying a slowly increasing current through the coil; and measuring the current in amperes when the value was sufficient to cause the reeds to contact. This current times the number of turns of wire in the coil yielded the "operate" value in ampere-turns, usually denoted "NI." When the average NI value measured by this method varied excessively from the average desired, the assembly machines were adjusted.

The coil method of determining the "operate" value, that is, testing a sealed contact has several disadvantages. A current with unwanted variations, such as ripples, would produce a magnetic field with unwanted flux variations which could lead to erroneous test values. For this reason, a relatively expensive "constant" current power supply is used to energize the coil. A disadvantage of this method is the high cost of the power supply required to carry out the method.

In addition, a precise meter is required to measure the current accurately and the meter must be calibrated at frequent intervals in order to provide reliable current measurements. Another disadvantage, then, of the coil method is the high cost of the meter and keeping it calibrated.

The current through the coil must be varied slowly so that the point at which the sealed contact operates may be determined. Consequently, the total testing time is increased significantly by the added time required to observe the exact point of operation of the sealed contact. Still another disadvantage, therefore, is the time consumed in varying the current slowly enough to determine the "operate" value accurately.

Since it is necessary in the coil method of testing a sealed contact to locate the gap of the contact midway in the coil for accurate test results, the sealed contact is threaded through the coil until the tip of a reed touches a properly located surface which stops the contact with the gap in the center of the coil. Then contacts are clamped against the reeds both to make electrical connections to the reeds and to hold the sealed contact in position. The necessity of inserting the sealed contact in and removing it from the coil, as well as the opening and closing of the contacts, adds still further to the time consumed. Consequently, still another disadvantage of this method of testing is the need to thread the sealed contact through a coil and to clamp contacts onto the reeds.

In the coil testing method, a means for indicating closure of the sealed contact is required and consists of an energy source in series with a lamp and the sealed contact. The lamp and energy source must be housed in a cabinet along with the power supply and meter, thus, consuming a significant amount of space. The space consumed by this apparatus, therefore, is still another disadvantage of this method.

SUMMARY OF THE INVENTION

Accordingly, it is an object of this invention to provide new apparatus for determining the "operate" value of sealed contacts.

It is still another object of this invention to provide a fast and inexpensive method of an apparatus for determining the "operate" value of a sealed contact.

Still another object of this invention is to provide a simple, reliable and efficient method of making an electrical test connection to a sealed contact.

It is a further object of this invention to reduce the space required for a sealed contact testing apparatus.

The foregoing and other objects are achieved in accordance with this invention by providing an elongated, plane permanent magnetic field of increasing flux density, along which a sealed contact is guided until it operates. Means responsive to closure of the sealed contact indicates the strength of the magnetic field at the point of closure and thereby the "operate" value. This provides a step forward in the art of testing sealed contacts by combining the simplicity, stability and low cost of a permanent magnetic field with the ease of varying the flux density inherent in an electromagnetic field.

The magnetic field of increasing flux density, is formed in a plane by a row of bar magnets in which each successive magnet, except the end magnets, in the row is spaced closer to a ferromagnetic member than the next.

The "operate" value of a sealed contact is determined by placing the sealed contact across a pair of parallel conductors between the ferromagnetic member and the magnets at the weak end of the magnetic field. The sealed contact is moved parallel to itself in the direction of increasing magnetic flux. The sealed contact is moved, while in contact with the conductors which are in series with an energy source 27—a lamp, until the sealed contact closes and lights the lamp. At this 27—27 the position of the sealed contact with respect to a reference scale shows the field strength and reveals the "operate" value in NI.

BRIEF DESCRIPTION OF THE DRAWINGS

Other objects, advantages and features of the invention will become apparent from the following detailed description of the specific embodiment thereof, when taken in conjunction with the appended drawings, in which:

FIG. 1 is an enlarged isometric view of a sealed contact showing the magnetic flux path through the contact;

FIG. 2 is an isometric view of the test apparatus;

FIG. 3 is a plan view showing that portion of the apparatus of FIG. 2 pertaining to the magnetic field; and FIG. 4 is a section of the magnetic field along the line 4—4 of FIG. 3.

Description of the Preferred Embodiment

Referring to FIG. 1, there is shown a "dry reed switch," hereafter called a sealed contact. The sealed contact 11 includes two reeds 12, having a round shank 14 and a flat spring 16, sealed into a glass envelope 13 so that the ends overlap and have a small gap 17 between them. The reeds 12 are preferably made of a ferromagnetic iron-nickel alloy which matches the expansion characteristics of the glass envelope 13.

Under the action of a magnetic flux, indicated by the dashed line along the longitudinal axis of the sealed contact 11, the reeds 12 become magnets with opposite poles at the gap 17 and, therefore, the overlapped portions of the reeds attract each other. When the magnetic flux is great enough, the attractive force overcomes the resistance of the springs 16—16 to bending. The springs 16—16 thereupon close and the overlapped portions contact each other at the gap 17 providing electrical continuity through the sealed contact 11.

The amount of magnetic flux, measured in ampereturns, required to close the reeds is the "operate" value which is determined most advantageously by the test apparatus of the invention.

Referring now to FIG. 2, there is shown a test apparatus for determining the "operate" value of a sealed contact, generally designated by the numeral 21. The apparatus 21 includes an elongated nonmagnetic base 23 and a nonmagnetic support 26 which is fastened to the base and is parallel to one of the long edges. The support 26 contains a plurality of transverse aperture through which a plurality of bar magnets 27—27 are inserted to provide a source of a magnetic field. The magnets 27—27 preferably are of equal strength and formed of a highly magnetic material, alnico, permanently magnetized and stabilized. It is to be understood, however, that individual electromagnets may be substituted for the permanent ones as the source of the magnetic field. A plurality of set screws 28—28, one for each magnet 27—27, permits locking the magnets 27—27 in place after they have been positioned in the apertures.

A ferromagnetic member, hereinafter termed a flux bar 24, and a nonmagnetic guide rail 31 are also fastened to the base 23 and are parallel to the magnet support 26. The guide rail 31 is spaced from the flux bar 34 slightly more than the length of a sealed contact 11.

Referring now to FIGS. 3 and 4, the support 26, the magnets 27—27, the flux bar 24 and the guide rail 31 are shown in a plan view, with a section removed to improve understanding. The dashed lines represent a portion of the lines of flux which form the magnetic field. Some of these lines follow a path from the north pole, marked N, of the magnets 27—27 through the air to the flux bar 24, through the flux bar and return through the air to the south pole, marked S. For convenience and clarity of illustration, in FIG. 3 the flux lines returning to the south pole, for example, of the right-hand magnet 27 have been cut both beyond the flux bar 24 and shortly before they enter the south pole. Likewise, for convenience and clarity the flux lines returning from the flux bar 24 to the other magnets have been omitted altogether.

The portion of the magnetic field of interest is the field between the flux bar 24 and the guide rail 31 lying in the plane A containing the magnet axes. Each succeeding magnet 27 from left to right, except for the first one in FIG. 3, is set with its north pole closer to the flux bar 24 than the preceding one. Because the flux bar 24 is ferromagnetic, it is a much better conductor of magnetic flux than air and, therefore, the magnetic flux seeks the flux bar. In addition, a short magnetic path has less magnetic reluctance than a long one. As a result, the reluctance is less for a magnet 27 positioned close to the flux bar than for a magnet 27 positioned further away and therefore the flux concentration is greatest where the magnets are closest to the flux bar 24. The effect, then, of the flux bar 24 and positioning each succeeding magnet 27—27 closer to the flux bar, is to produce a magnetic field of increasing flux density which is useful in a plane extending the length of the base 23 between the flux bar 24 and the guide rail 31. A ferromagnetic material spanning the space between the flux bar 24 and the guide rail 31 is a better flux conductor than air and, therefore, provides a conducting path for most of the adjacent flux.

The reeds of a sealed contact 11 placed in such a field as shown in FIGS. 3 and 4, therefore, carry a large portion of the surrounding flux and become magnetic. The more flux the reeds 12 conduct, the more magnetic they become until the force of attraction closes the reeds. Accordingly, the magnetic field is established with a flux density insufficient at one end to close the reeds 12 but gradually increasing until it is more than sufficient at the other. A sealed contact traversing such a field will find some point at which it will "operate."

It has been found that some flux is lost around the ends of the apparatus and therefore, fewer lines of flux from the end magnets 27—27 intercept the flux bar 24 than from the other magnets. This is overcome by adjusting the end magnets 27—27 closer to the flux bar 24 to increase the lines of flux intercepted from the end magnets. As a practical matter, there may be no need to so adjust the right-hand magnet 27 because the sealed contact, the "operate" value of which is being determined, has already operated before reaching the right-hand end.

Referring back to FIG. 2, a nonmagnetic guide 32 is movably mounted on the base 23 between the flux bar 24 and guide rail 31 so that is slides from one end of the base to the other. However, it is sufficiently constrained to maintain the face 33 perpendicular to the flux bar 24 and the guide rail 31, i.e., parallel to the lines of flux, so that a sealed contact which is held against the face 33 has its longitudinal axis parallel to the magnetic field.

A pair of nonmagnetic conductors 29—29 are insulated from each other and supported form the base 23 at the elevation of the axes of the magnets 27—27. The conductors 29—29 are spaced apart so that the shank 14 of each reed 12 of the sealed contact 11 rests on one of the conductors. As a result, the conductors support the sealed contact 11 as it is moved along the base 23. A lamp 37 connected in series with the conductors and an energy source 36, such as a battery, lights when an electrical connection is made between the conductors 29—29 by the sealed contact 11.

A nonmagnetic scale 34 is fixed to the base 33 between the flux bar 24 and the guide rail 31 beneath the guide 32. The scale 34 is suitably divided with markings to indicate the strength of the magnetic field in ampere-turns. For example, a scale marking of 30 means the field strength is equivalent to 30 NI at that point. The left edge of the guide 32 acts as an indicator or pointer and, in cooperation with the scale 34, shows the strength of the magnetic field at any position of the guide 32.

For convenience, the scale 34 is divided into even increments or divisions. Calibration is accomplished by means of sealed contacts 11 whose "operate" values have been previously determined, by a suitable coil and current method, to have the values required for calibrating several points on the scale. For example, sealed contacts might be selected, one of which has an "operate" value of 25 NI, another 27 NI, another 29 NI, and so on. These contacts are then placed in the guide 32 with the left edge of the guide at the appropriate scale marking and the magnets 27—27 adjusted toward or away from the flux bar 24 until the sealed contacts close. By starting with the 25 NI sealed contact and proceeding along the scale using each higher valued sealed contact in turn, the magnets 27—27 may be adjusted for the full length of the scale 34.

Operation

The guide 32 is moved all the way to the left to the weak end of the magnetic field. A sealed contact 11 is then placed against the face 33 of the guide 32 with the end of one shank 14 against the guide rail 31 and with both shanks 14—14 of the reeds 12 resting on and supported by the conductors 29—29.

With the sealed contact 11 thus positioned, the guide 32 and sealed contact 11 are moved together along a path from left to right in the direction of increasing magnetic field. As the sealed contact 11 is so moved, the contact eventually encounters magnetic flux which is strong enough to close the reeds 12, i.e., operate the sealed contact. Upon the operation of the sealed contact 11, the conductors 29—29 are electrically connected, the lamp 37 lights and, at this point, left-to-right movement is stopped, The left-hand edge of the guide 32 then marks the "operate" value on the scale 34.

Illustrative Example

The size of the magnets 27—27 and the flux bar 24, and the spacings involved, are determined by experimentation to suit the particular size sealed contact to be tested. For example, the dimensions of a sealed contact and the salient dimensions of the apparatus for testing it are shown in the following table:

| Item | Dimensions |
| --- | --- |
| Sealed Contact | |
| Shank 14 | 0.022 of an inch in diameter by one-half inch long |
| Spring 16 | 0.008 of an inch thick by 0.049 of an inch wide by 0.400 of an inch long |
| Sealed Contact 11 | Approximately 1.8 inches overall length |
| Overlap | 0.030 of an inch |
| Gap | 0.0055 of an inch |
| Test Apparatus | |
| Magnets 27 | one-fourth of an inch in diameter by 1½ inches long of alnico stabilized at about 80 percent of saturation |
| Flux Bar 24 | Cold rolled steel three-sixteenths of a square inch cross-sectional area |
| Magnet Spacing | One-half of an inch magnet-to-magnet |
| Spacing of Flux Bar 24 to Magnet Support 26 | 3⅜ inches center Line-to-center line |

An

What is claimed is:

1. An apparatus for determining the "operate" value of a sealed contact, the contact being moved along a path through a magnetic field, which comprises:
   a plurality of magnets spaced in a row with each succeeding magnet set closer to the path of the sealed contact for establishing an elongated magnetic field in a plane of increasing strength along the path to operate the sealed contact;
   means for guiding the sealed contact along the path through the magnetic field in the direction of the increasing strength to operate the contact at a point along the field; and
   means responsive to the operation of the contact at such point for indicating the "operate" value of such contact.

2. An apparatus as recited in claim 1 wherein the magnets are arranged with like poles adjacent the path of the sealed contact.

3. An apparatus for determining the "operate" value of a sealed contact, which comprises:
   a base of nonmagnetic material;
   a plurality of magnets, spaced in a row and supported on the base with their magnetic axes transverse to the row, which establish an elongated magnetic field in a plane parallel to and adjacent the base;
   a flux bar parallel to the row of magnets, spaced the length of a sealed contact from said row, and in the same plane as an cooperating with the magnets to form the magnetic field in the plane;
   nonmagnetic means supported by the base for guiding the sealed contact in alignment with and in a prescribed path along the magnetic field in the long direction to operate the sealed contact at a point along the field; and
   means mounted on the base and responsive to the operation of the contact at such point and cooperating with the guide means, for indicating the "operate" value of such contact.

4. An apparatus as recited in claim 3, wherein:
   the flux bar is a ferromagnetic member which forms a portion of a path for the magnetic flux;
   the magnets are permanent bar magnets incrementally supported in a row parallel to the ferromagnetic member; and
   the magnets are adjusted in the supporting means so that successive magnets in the row are closer to the ferromagnetic member thereby producing a plane magnetic field of increasing flux density along such member.

5. An apparatus as recited in claim 4 wherein the first magnet in the row at the end of the magnetic field of lowest flux density, is positioned closer to the ferromagnetic member than the adjacent magnets to compensate for the loss of magnetic flux around the end of the row.

6. an apparatus as recited in claim 3 wherein the means for guiding the sealed contact comprises:
   a guide rail of nonmagnetic material adjacent the magnets and parallel to the flux bar for preventing axial movement of the sealed contact as it moves in long direction through the magnetic field in a path parallel to the flux bar; and
   a nonmagnetic guide slideably mounted on the base between the flux bar and guide rail for maintaining the sealed contact axis parallel to the flux lines of the magnetic field and cooperating with the indicating means to designate the "operate" value.

7. An apparatus as recited in claim 6 wherein the means for indicating the "operate" value comprises:
   a pair of parallel electrical conductors arranged between the flux bar and guide rail in the direction of the increasing field and insulated and spaced from each other so that each shank of the sealed contact, the "operate" value of which is to be determined, touches one of the conductors;
   a lamp and a source of energy, both of which are connected in series with the conductors to light the lamp upon the interconnection of the conductors; and
   a scale mounted on the base adjacent the guide rail and having indices to show the strength of the magnetic field and cooperating with the guide means to indicate the "operate" value of the sealed contact at the point along the field where the contact operates to interconnect the conductors to light the lamp.

8. An apparatus for determining the "operate" value of sealed contacts, which comprises:
   a nonmagnetic base;
   a nonmagnetic support fixed to the base;
   a plurality of permanent magnets mounted in the support in spaced relationship with their magnetic axes transverse to the support to establish an elongated magnetic field acting effectively in a plane parallel to and adjacent the base and having an increasing flux density in one direction along the plane, the flux density being sufficient to operate a sealed contact, the "operate" value of which is to be determined, at one end of the plane but not at the other;
   a ferromagnetic flux bar parallel to the support and spaced therefrom for providing a portion of a magnetic flux path and cooperating with the magnets in establishing and defining the plane magnetic field;
   a nonmagnetic guide rail parallel to and in the proximity of the magnet support for maintaining the sealed contact equidistant from the flux bar;

a nonmagnetic guide movably mounted between the flux bar and the guide rail for holding the sealed contact for movement through the length of the magnetic field and parallel to the magnetic flux lines;

a pair of parallel nonmagnetic conductors insulated from each other and mounted on the base between and parallel to the flux bar and guide rail, each conductor being contacted by one reed of the sealed contact;

a lamp and a source of energy, both of which are serially connected to the conductors to light the lamp upon the interconnection of the conductors; and a nonmagnetic scale mounted on the base and having indices increasing in the direction of the increasing magnetic field, the scale cooperating with the guide to indicate the "operate" value of the sealed contact at he point along the path where the contact operates to interconnect the conductors to light the lamp.